May 23, 1933. E. GREEN 1,910,604
ELECTRICAL HIGH FREQUENCY CIRCUITS
Filed May 5, 1932
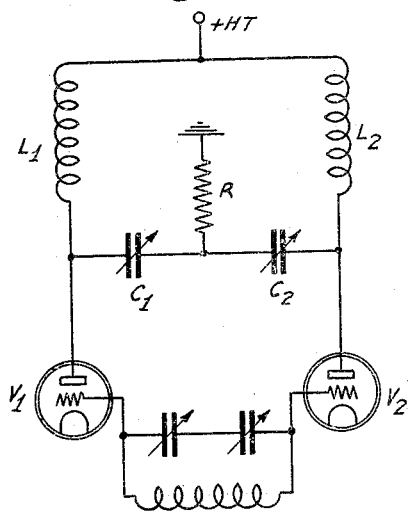
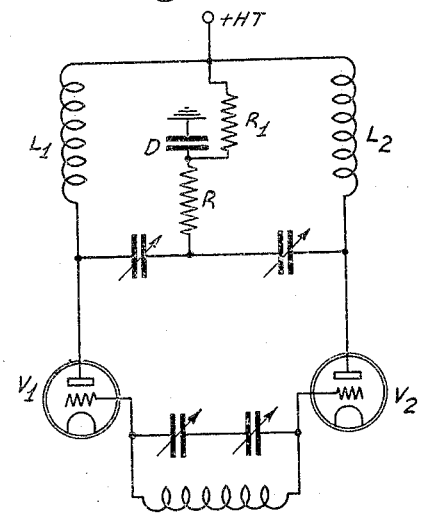
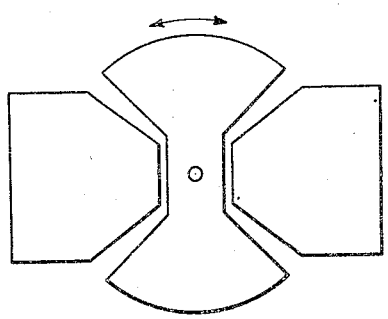
INVENTOR
ERNEST GREEN
BY
ATTORNEY Patented May 23, 1933

1,910,604

UNITED STATES PATENT OFFICE

ERNEST GREEN, OF PENROSE, LONG STOMPS, CHELMSFORD, ENGLAND, ASSIGNOR TO RADIO CORPORATION OF AMERICA, A CORPORATION OF DELAWARE

ELECTRICAL HIGH FREQUENCY CIRCUITS

Application filed May 5, 1932, Serial No. 609,363, and in Great Britain April 28, 1931.

This invention relates to electrical high frequency circuits.

In many electrical high frequency circuits employed in connection with thermionic valves it is often advantageous to employ two condensers in series and to earth the central point between the two condensers for stabilizing purposes. For example, in the case of a pair of valves in push-pull it is customary to tune the common anode circuit of said valves by a pair of variable condensers in series the said condensers being connected in series between the two anodes between which points is also connected the inductance of the tuned circuit the high tension feed being connected to the middle point of said inductance. For purposes of stability and to prevent parasitic oscillations it is often found necessary or desirable to earth the point between the two condensers either directly or through a non-inductive resistance. It will be seen that with this arrangement the maximum voltage between the earthed middle point between the condensers and each anode is equal to the sum of the direct current voltage due to the source of anode potential and the peak value of the alternating current voltage. The sum of these voltages may be and commonly is a high value with the result that if the condensers are to maintain a sufficient factor of safety as regards insulation the fixed and moving vanes must be spaced further apart than would be necessary if a lower potential were in question, and this increased spacing in turn means the adoption of larger condensers for a given capacity.

According to this invention in a high frequency electrical circuit comprising condensers in series and subjected to both alternating and direct current potentials and in which a point between the condensers is desired to be effectively earthed as regards alternating current potentials, the said point is earthed through a condenser so that the direct current voltage is maintained at the said point, although the alternating current voltage is not.

In one way of carrying out the invention as applied to the tuned anode push-pull circuit above described, the centre point between the two condensers is earthed through a resistance and a condenser in series the "live" side of said earthed condenser i. e. the junction point of said earthed condenser with said resistance being connected to the positive terminal of the anode supply source through a further resistance.

Although the invention has been above set forth as relating to electrical circuit arrangements embodying a plurality of condensers in series, it is to be understood that the said condensers may and in many cases will be comprised in a single mechanical structure.

The invention is illustrated and explained in connection with the accompanying drawing wherein, Figure 1 is a diagrammatic illustration of a known push-pull arrangement; Figure 2 shows the system of Figure 1 modified in accordance with the present invention; and, Figure 3 illustrates a schematic showing of a condenser unit which may be utilized in connection with the present invention. Referring to Figure 1, this shows diagrammatically a known arrangement in which a pair of valves $V_1$, $V_2$ in push-pull have their common anode circuit tuned by a pair of variable condensers $C_1$, $C_2$ in series, the said condensers being connected, as shown, in series between the two anodes between which points are also connected inductance coils $L_1$, $L_2$ which with the condensers $C_1$, $C_2$ constitute the tuned anode circuit. The high tension connection is made as shown to the central point between the inductances $L_1$, $L_2$. For purposes of stability and to prevent parasitic oscillation it is often found necessary or desirable to earth the point between the two condensers $C_1$, $C_2$ either directly or through a non-inductive resistance R. It will be appreciated that this arrangement presents the disadvantage that the maximum voltage between the earthed middle point and each anode is equal to the sum of the direct current voltage due to the source of anode potential and the peak value of the alternating current voltage.

Figure 2 shows diagrammatically the circuit of Figure 1 modified in accordance with this invention.

It will be seen that in Figure 2 the point between the condensers $C_1$, $C_2$ is earthed through a resistance R and a condenser D in series with one another, a connection from the high tension supply being brought through a resistance $R_1$ as shown. This modification is of substantial practical advantage inasmuch as the voltage across the condensers is reduced to a value equal to the peak alternating current voltage and this reduction in voltage permits of closer spacing of the vanes of the condensers and therefore the obtaining of a larger capacity with given dimensions and conditions of safety.

As previously stated the condensers connected in series with one another may conveniently be comprised in a single mechanical structure. Such a single mechanical structure of form well known per se, is illustrated schematically in Figure 3 of the accompanying drawing from which it will be seen that the condenser unit consists of two banks of fixed vanes arranged opposite one another and spaced apart, a co-operating bank of interleaving moving vanes being mounted for rotation about an axis passing between the two banks of fixed vanes and at right angles to the planes of the said vanes. Each vane in the moving bank of vanes approximates in shape to a pair of sectors on either side of the axis of rotation said sectors embracing each rather less than 90° the vanes in the fixed banks being appropriately shaped to co-operate with the moving vanes. The two terminals of the condenser structure thus constituted are the two banks of fixed vanes. This condenser structure although a single mechanical unit is electrically two condensers in series the junction point of the two condensers being the bank of moving vanes.

The condenser unit as shown in Figure 3 may, of course, be conveniently employed as the condensers $C_1$ and $C_2$ of Figure 2.

Having now particularly described and ascertained the nature of my said invention and in what manner the same is to be performed, I declare that what I claim is:—

1. An electrical circuit comprising a pair of thermionic tubes, push-pull input and output circuits therefor, tuning means for said push-pull output circuit comprising, a pair of tuning condensers in series shunted across said output circuit, a connection from the common point of said two series connected condensers to ground, said connection including an impedance and a capacity in series, a high potential terminal of a source of plate current connected to the center of the push-pull output circuit, and a connection, including an impedance element from said center point to a point of said first named connection between the impedance and capacity.

2. In a high frequency electrical circuit, a pair of thermionic tubes, push-pull input and output circuits therefor, tuning means for said push-pull input circuit, tuning means for said push-pull output circuit comprising, a pair of variable condensers in series and symmetrically disposed relative to the push-pull output circuit, a connection for alternating current only from a point of said connection intermediate the two series condensers to ground, said connection including a resistance element, a terminal of a plate current source connected to the center of the push-pull output circuit, and a connection including an impedance from the first named connection to said terminal.

ERNEST GREEN.